US011458899B1

(12) United States Patent
Wuerthele et al.

(10) Patent No.: US 11,458,899 B1
(45) Date of Patent: Oct. 4, 2022

(54) VEHICULAR LIGHTING SYSTEM

(71) Applicant: Toyota Motor Engineering & Manufacturing North America, Inc., Plano, TX (US)

(72) Inventors: Stuart Roger Wuerthele, Saline, MI (US); Skylar C. Watson, Williamston, MI (US); Alexander L. Paradis, Ann Arbor, MI (US); Frank A. Richards, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/703,075

(22) Filed: Mar. 24, 2022

(51) Int. Cl.
 *B60R 1/12* (2006.01)
 *F21S 43/19* (2018.01)

(52) U.S. Cl.
 CPC .......... *B60R 1/1207* (2013.01); *F21S 43/195* (2018.01)

(58) Field of Classification Search
 CPC .................. B60R 1/1207; F21S 43/10–195
 See application file for complete search history.

(56) References Cited

U.S. PATENT DOCUMENTS

| | | | |
|---|---|---|---|
| 3,017,500 A | 1/1962 | Pezzopane | |
| 4,802,069 A | 1/1989 | Chandler | |
| 6,416,209 B1 | 7/2002 | Abbott | |
| 6,945,679 B2 | 9/2005 | Young | |
| 8,764,256 B2 | 7/2014 | Foote et al. | |
| 9,283,819 B2 | 3/2016 | Salter et al. | |
| 10,183,615 B2 | 1/2019 | Herrera Gutierrez et al. | |
| 2014/0217342 A1* | 8/2014 | Dondurur | B60S 9/12 254/423 |

FOREIGN PATENT DOCUMENTS

| | | |
|---|---|---|
| DE | 202005018233 U1 | 1/2006 |
| KR | 19980018807 U | 9/1996 |
| KR | 100613553 B1 | 8/2006 |
| KR | 100822548 B1 | 4/2008 |

* cited by examiner

*Primary Examiner* — Jason M Han
(74) *Attorney, Agent, or Firm* — Christopher G. Darrow; Darrow Mustafa PC

(57) ABSTRACT

A lighting system for a vehicle can include a sideview mirror assembly mountable to an exterior of the vehicle over a ground area near the vehicle. The lighting system can also include a service lamp integrated with the sideview mirror assembly. The service lamp can be configured to project one or more narrow beams of light to illuminate one or more jack placement indicator spots on the ground area. The service lamp can also be configured to project one or more broad beams of light to illuminate the ground area and/or one or more wheels of the vehicle.

18 Claims, 3 Drawing Sheets

VEHICULAR LIGHTING SYSTEM

TECHNICAL FIELD

The embodiments disclosed herein relate to lighting systems and, more particularly, to a lighting system for a vehicle and a method of operating the lighting system.

BACKGROUND

Some vehicles include sideview mirror assemblies for viewing the area to the side of the vehicle and/or to the rear of the vehicle. As a part of the sideview mirror assembly, the vehicle may include one or more lamps, such as turn signal lamps and/or service lamps.

SUMMARY

Disclosed herein are embodiments of a lighting system for a vehicle and a method of operating the lighting system.

In one aspect, the lighting system includes a sideview mirror assembly. The sideview mirror assembly is mountable to an exterior of a vehicle over a ground area near the vehicle. The lighting system also includes a service lamp. The service lamp is integrated with the sideview mirror assembly. The service lamp is configured to project narrow beam light to illuminate one or more jack placement indicator spots on the ground area.

In another aspect, the lighting system includes a service lamp integrated with a sideview mirror assembly mountable to an exterior of a vehicle over a ground area near the vehicle. A method of operating the lighting system includes activating the service lamp to project narrow beam light to illuminate one or more jack placement indicator spots on the ground area upon at least one of receiving an activation signal from a user interface of the vehicle, and the detection of at least one of low tire pressure of one or more tires of the vehicle, a transmission position of the vehicle being in park, a low-light external environment of the vehicle, and removal of a jack from the vehicle.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a lighting system for a vehicle. The lighting system includes a sideview mirror assembly mountable to an exterior of the vehicle over a ground area near the vehicle. The lighting system can also include a service lamp integrated with the sideview mirror assembly. The service lamp can be configured to project narrow beam light to illuminate one or more jack placement indicator spots on the ground area. The jack placement indicator spots can indicate to a user of the vehicle where to correctly place a jack for changing one of the wheels. The service lamp can also be configured to project broad beam light to illuminate the ground area and/or one or more wheels of the vehicle. Illuminating the ground area and/or the wheel(s) of the vehicle may be helpful to the user when performing maintenance on the vehicle.

Figure 1A:
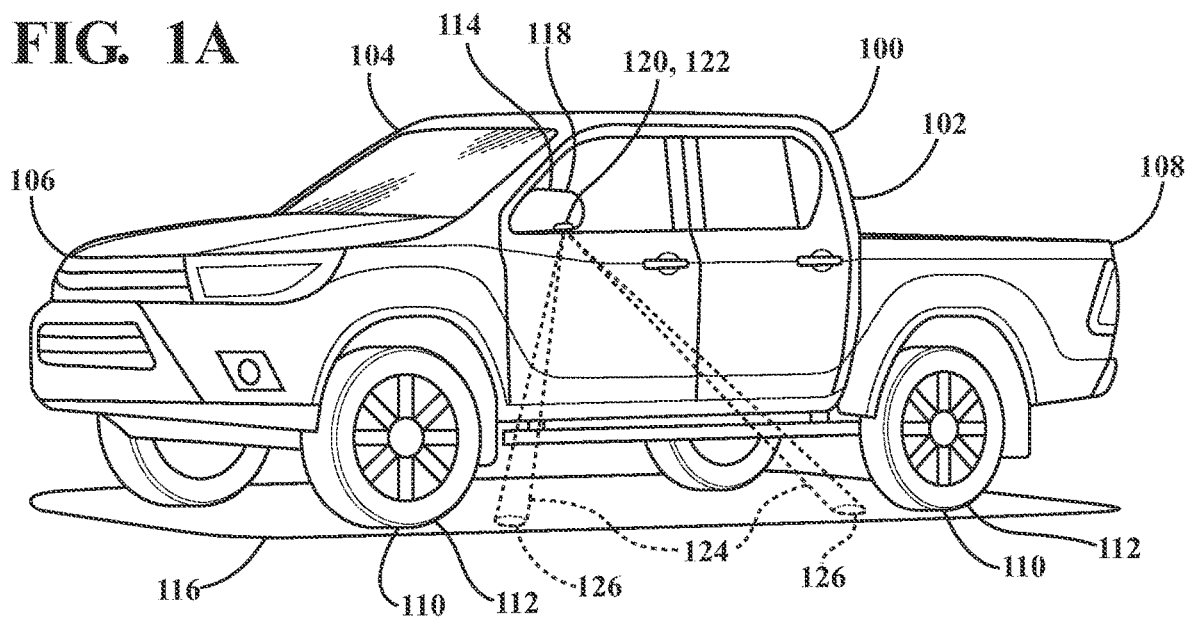
FIG. 1A is an example of a vehicle including a service lamp configured to illuminate one or more jack placement indicator spots on a ground area near the vehicle.
Figure 1B:
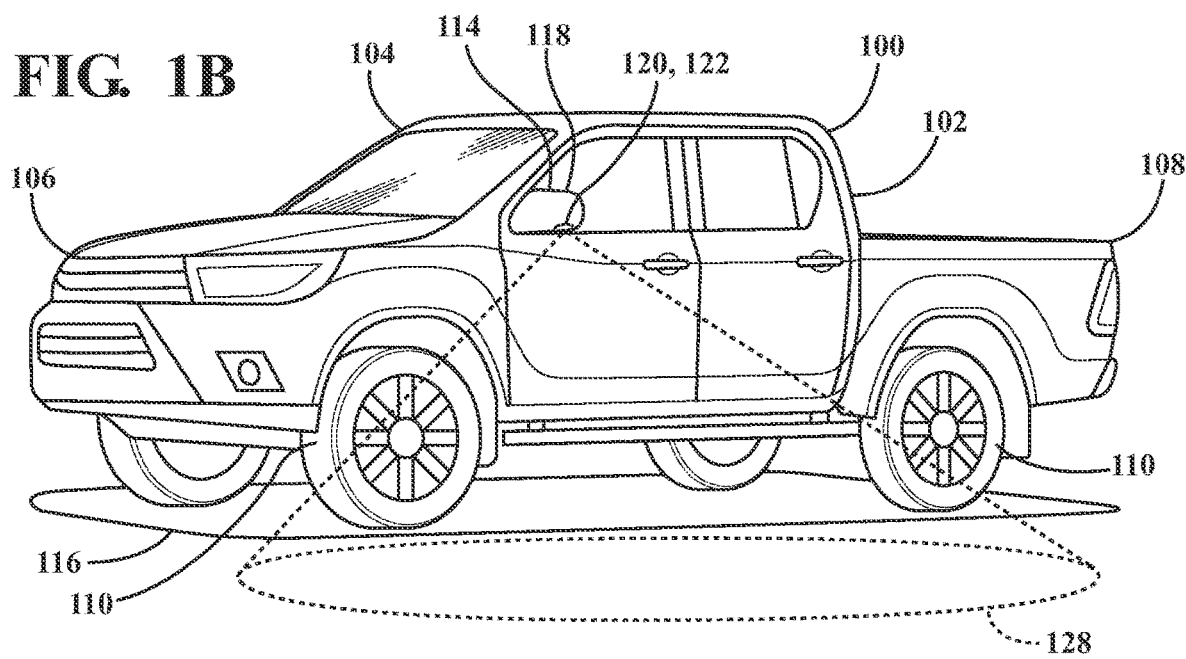
FIG. 1B is an example of the vehicle of FIG. 1A, in which the service lamp is configured to illuminate the ground area.
Figure 1C:
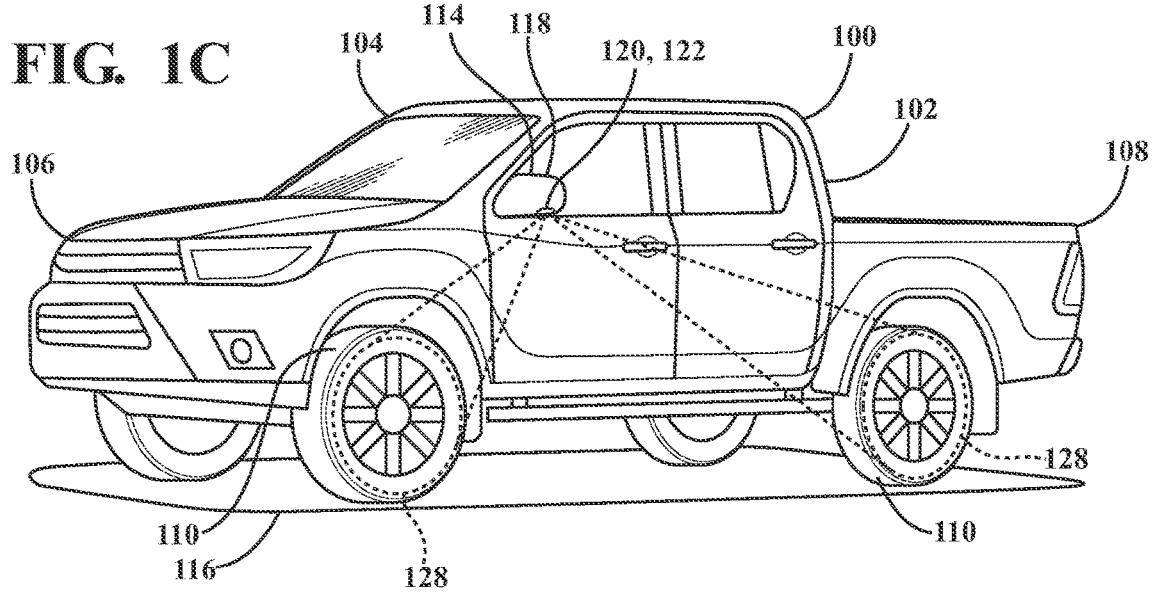
FIG. 1C is an example of the vehicle of FIGS. 1A and 1B, in which the service lamp is configured to illuminate one or more wheels of the vehicle.

A representative passenger vehicle 100 is shown in FIGS. 1A-1C. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 includes an exterior 102 and a number of interior compartments. The compartments include a passenger compartment 104, an engine compartment 106 (and, in the illustrated pickup truck configuration of the vehicle 100, an open-topped bed 108 for carrying cargo). As shown, the vehicle 100 is a pickup truck. However, the vehicle 100 can be any suitable type of vehicle. For example, the vehicle 100 can be a sedan, an SUV, a semi-truck, etc. Among other things, the vehicle 100 may include seats, a dash assembly, an instrument panel, controls, and the like housed in the passenger compartment 104. Additionally, the vehicle 100 may include an engine, a motor, a transmission, and the like, as well as wheels 110, housed in the engine compartment 106 and elsewhere in the vehicle 100. The wheels 110 can include tires 112 that support the vehicle 100 on the ground. One, some, or all of the wheels 110 are powered by the powertrain components to drive the vehicle 100 along the ground.

The vehicle 100 also includes two sideview mirror assemblies 114. The sideview mirror assemblies 114 are configured to enable a user (e.g., a driver or a passenger) of the vehicle 100 to view the sides of the vehicle 100 and an area rearward of the vehicle 100. Each sideview mirror assembly 114 is mountable to the exterior 102 on either side of the vehicle 100 above a ground area 116 near the vehicle 100. For brevity, this description follows with reference to the sideview mirror assembly 114 mounted on the driver's side of the vehicle 100. By extension, this description follows with reference to the other sideview mirror assembly 114 mounted on the passenger's side of the vehicle 100, which is configured as a mirror image of the sideview mirror assembly 114 mounted on the driver's side of the vehicle 100.

The sideview mirror assembly 114 includes a body 118, which defines an opening for a sideview mirror. The sideview mirror assembly 114 can also include a mounting arm configured to mount the body 118 to the exterior 102. The sideview mirror assembly 114 also includes one or more lamps 120. The lamp(s) 120 can be integrated with the sideview mirror assembly 114. For example, the lamp(s) 120 can be attached to the body 118 and/or located at least partially within the body 118. The lamp(s) 120 can include any type of lamp that can be used for various purposes. For example, the lamp(s) 120 can include one or more turn signal lamps for signaling to other nearby drivers and/or pedestrians the intent of the driver of the vehicle 100 to make a turn. In another example, the lamp(s) 120 can include one or more blind spot lamps for signaling to the driver that there is a nearby vehicle or other object in the driver's blind spot. In yet another example, the lamp(s) 120 can include one or more puddle lamps for illuminating an area near the vehicle 100.

In some instances, a user of the vehicle 100 may need to perform maintenance on the vehicle 100, for example, the user may need to change a tire 112. In some instances, the user may need to perform such maintenance in low-light conditions. Accordingly, it may be advantageous to provide the user with a service lamp 122 to illuminate one or more parts of the vehicle 100 and/or one or more areas near the vehicle 100 so the user has visibility when performing maintenance.

The service lamp 122 can be one of the lamp(s) 120 of the sideview mirror assembly 114 and can be connected to existing wiring in the sideview mirror assembly 114 that may be used for other lamp(s) 120 in the sideview mirror assembly 114. For example, the service lamp 122 can be electrically connected to existing wiring used for turn signal lamps, blind spot lamps, and/or puddle lamps. The service lamp 122 can be oriented facing downwards or otherwise oriented to illuminate areas beneath the sideview mirror assembly 114. The service lamp 122 can also be oriented slightly inward toward the side of the vehicle 100 so that the wheel(s) 110 can be illuminated.

Referring to FIG. 1A, the service lamp 122 can be configured to project one or more narrow beams of light 124. The narrow beam(s) of light 124 can be used to illuminate one or more jack placement indicator spots 126 on the ground area 116. The jack placement indicator spot(s) 126 can indicate to a user where a jack should be placed in order to properly lift the vehicle 100 to change one of the tires 112. Referring to FIGS. 1B and 1C, the service lamp 122 can also be configured to project one or more broad beams of light 128. The broad beam(s) of light 128 can be used to illuminate a portion of the ground area 116, as shown in FIG. 1B, and/or the wheel(s) 110, as shown in FIG. 1C. The service lamp 122 can project the narrow beam(s) of light 124 and the broad beam(s) of light 128 together, and/or the service lamp 122 can project the narrow beam(s) of light 124 and the broad beam(s) of light 128 separately.

The service lamp 122 can be configured to project the narrow beam(s) of light 124 and/or the broad beam(s) of light 128 in any suitable manner. In one example, the service lamp 122 can include various different lights. The lights can include one or more spotlights and one or more floodlights. The spotlight(s) can be configured to project the narrow beam(s) of light 124 to illuminate the jack placement indicator spots 126, and the floodlight(s) can be configured to project the broad beam(s) of light 128 to illuminate the ground area 116 and/or the wheel(s) 110. In another example, the service lamp 122 can include a mask, one or more shutters, holographics, incandescent lights, LED lights, micro lens array (MLA) technology, and/or any other suitable lighting technology.

In some instances, the narrow beam(s) of light 124 may be brighter than the broad beam(s) of light 128 in order to distinguish the jack placement indicator spots 126 on the ground area 116. Additionally or alternatively, the narrow beam(s) of light 124 may be a different color than the broad beam(s) of light 128. For example, the broad beam(s) of light 128 may be white and the narrow beam(s) of light 124 may be amber or any other suitable color.

Figure 2:
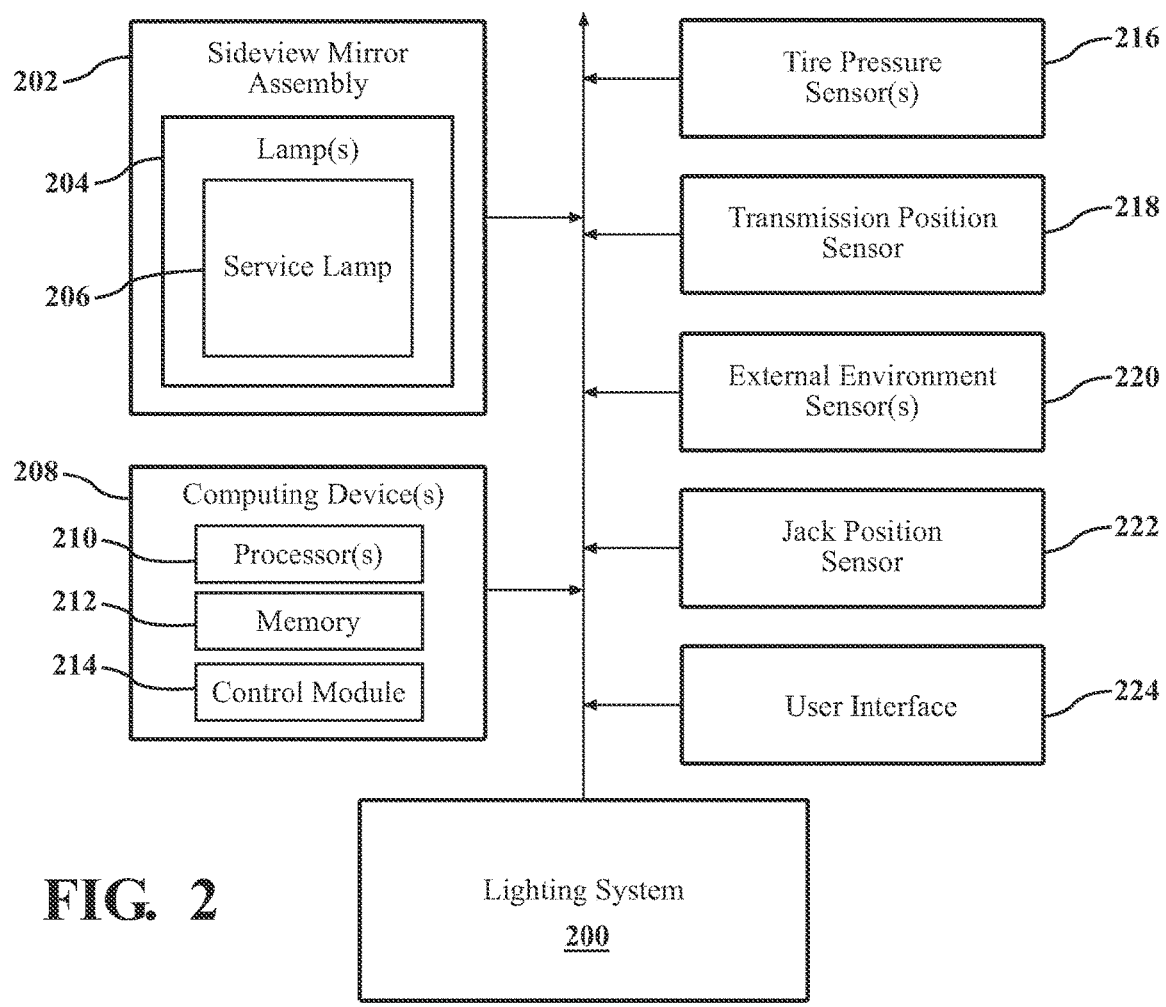
FIG. 2 is an example of a lighting system that may be used in conjunction with the service lamp of FIGS. 1A-1C.

Referring now to FIG. 2, an example of a lighting system 200 for a vehicle is shown. The lighting system 200 can include a sideview mirror assembly 202 including one or more lamps 204, the lamp(s) 204 including a service lamp 206. The sideview mirror assembly 202 can be the sideview mirror assembly 114 shown in FIGS. 1A-1C, the lamp(s) 204 can be the lamp(s) 120 shown in FIGS. 1A-1C, and the service lamp 206 can be the service lamp 122 shown in FIGS. 1A-1C. The lighting system 200 can also include one or more processor(s) 210, a memory 212, and a control module 214 to which the other elements of the lighting system 200 are communicatively connected. The processor(s) 210, the memory 212, and the control module 214 together serve as one or more computing devices 208 whose control module 214 is employable to orchestrate the operation of the lighting system 200, in whole or in part. The control module 214 can gather information from the lighting system 200, evaluate the information from the lighting system 200, and operate the lighting system 200 based on its evaluation.

This information can include information from various sensors of the lighting system 200. For example, the information can include information from one or more tire pressure sensors 216, a transmission position sensor 218, one or more external environment sensors 220, and a jack location sensor 222. The tire pressure sensor(s) 216 can be any suitable tire pressure sensors configured to sense the pressure of one or more of the tires 112. The transmission position sensor 218 can be any suitable transmission position sensor configured to sense the position of a transmission of the vehicle 100. For example, the transmission position sensor 218 can be configured to sense if the transmission of the vehicle 100 is in park, reverse, neutral, drive. etc. the jack location sensor 222 can be any suitable jack location sensor 222 configured to sense if a jack housed within the vehicle 100 is located within or otherwise attached to the vehicle 100. For example, if the jack is housed under the bed 108, the jack location sensor 222 can sense if the jack is placed under the bed 108 or if the user has removed the jack from under the bed 108. The external environment sensor(s) 220 can include any suitable type of external environment sensor configured to sense the ambient light level of the external environment of the vehicle 100. For example, the external environment sensor(s) 220 can be configured to sense if the external environment is light (e.g., daytime) or dark (e.g., nighttime).

The computing device(s) 208 can be configured to receive information from the tire pressure sensor(s) 216, the transmission position sensor 218, the external environment sensor(s) 220, and/or the jack location sensor 222, and automatically activate the service lamp 206 based on the information. For example, the computing device(s) 208 can be configured to automatically activate the service lamp 206 upon the detection of low tire pressure of at least one of the tires 112 by the tire pressure sensor(s) 216. More specifically, if the tire pressure sensor(s) 216 sense that the front driver's side tire of the vehicle 100 has low tire pressure, the service lamp 206 can be activated to illuminate the jack placement indicator spot 126 near the front driver's side tire. Similarly, if the rear driver's side tire of the vehicle 100 has low tire pressure, the service lamp 206 can be activated to illuminate the jack placement indicator spot 126 near the rear driver's side tire. In another example, the computing device(s) 208 can be configured to automatically activate the service lamp 206 upon the detection of the transmission of the vehicle 100 being in park by the transmission position sensor 218. In another example, the computing device(s)

208 can be configured to automatically activate the service lamp 206 upon the detection of a low-light external environment of the vehicle 100 by the external environment sensor(s) 220. In yet another example, the computing device(s) 208 can be configured to automatically activate the service lamp 206 upon the detection of the removal of the jack from the vehicle 100 by the jack location sensor 222. The computing device(s) 208 can be configured to activate the service lamp 206 when one or more of these conditions are detected. As described herein, activating the service lamp 206 can include activating the service lamp 206 when the service lamp 206 is off and causing the service lamp 206 to remain activated when it is on.

The computing device(s) 208 can be configured to receive information from the tire pressure sensor(s) 216, the transmission position sensor 218, the external environment sensor(s) 220, and/or the jack location sensor 222, and automatically deactivate the service lamp 206 based on the information. For example, the computing device(s) 208 can be configured to automatically deactivate the service lamp 206 upon the detection of normal tire pressure of all of the tires 112 by the tire pressure sensor(s) 216. In another example, the computing device(s) 208 can be configured to automatically deactivate the service lamp 206 upon the detection of the transmission of the vehicle 100 being in drive by the transmission position sensor 218. In another example, the computing device(s) 208 can be configured to automatically deactivate the service lamp 206 upon the detection of a normal-light or high-light external environment of the vehicle 100 by the external environment sensor(s) 220. In yet another example, the computing device(s) 208 can be configured to automatically deactivate the service lamp 206 upon the detection of the placement of the jack from the vehicle 100 by the jack location sensor 222. The computing device(s) 208 can be configured to deactivate the service lamp 206 when one or more of these conditions are detected. As described herein, deactivating the service lamp 206 can include deactivating the service lamp 206 when the service lamp 206 is on and causing the service lamp 206 to remain deactivated when it is off.

The lighting system 200 can also include a user interface 224. The user interface 224 can be located in the vehicle 100, for example, on a dashboard or instrument panel of the vehicle 100 and can be used to activate and/or deactivate the service lamp 206. The user interface 224 can be configured to receive an input from a user of the vehicle 100. The input can be an activation input or a deactivation input. The activation input may be received by the computing device(s) 208 and may cause the computing device(s) 208 to activate the service lamp 206. The deactivation input may be received by the computing device(s) 208 and may cause the computing device(s) 208 to deactivate the service lamp 206.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps not shown here, and the method is not limited to including every step shown. The blocks illustrated here as part of the method are not limited to the particular chronological order. Indeed, some of the blocks may be performed in a different order than what is shown and/or at least some of the blocks shown can occur simultaneously.

Figure 3:
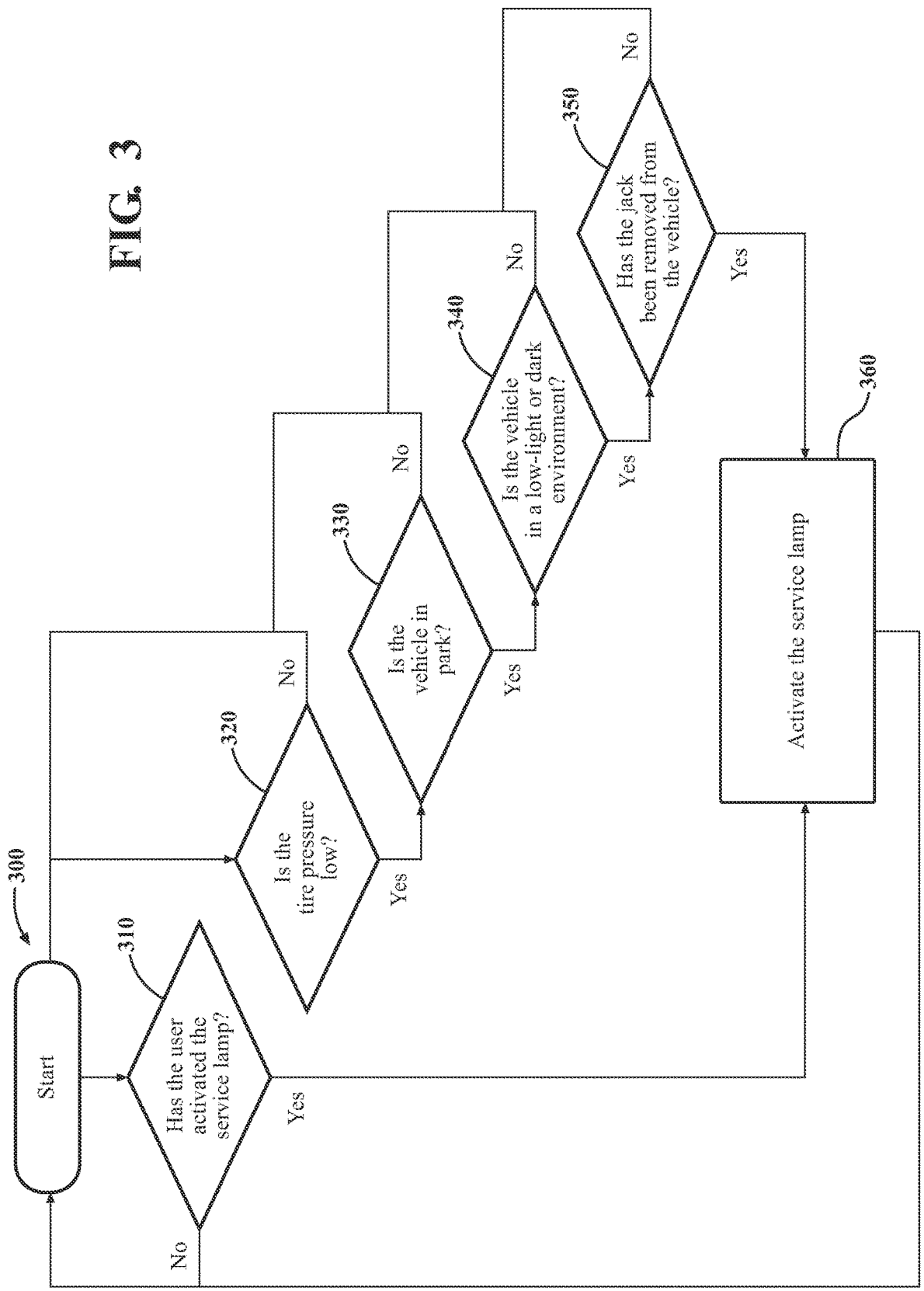
FIG. 3. is an example of a method of operating the lighting system of FIGS. 1A-2.

Referring to FIG. 3, an example of a method 300 is shown. In operation 310, the computing device(s) 208 can determine whether the user has activated the service lamp 206. For example, the computing device(s) 208 can receive an activation input from a user interface 224 of the vehicle 100. If the computing device(s) 208 receives the activation input, the method 300 can proceed to operation 360, in which the computing device(s) 208 will activate the service lamp 206.

In operation 320, the computing device(s) 208 can determine whether one or more of the tires 112 has low tire pressure. For example, the computing device(s) 208 can receive information from the tire pressure sensor(s) 216 indicating that one or more of the tires 112 has low tire pressure. If the computing device(s) 208 determines that one or more of the tires 112 has low tire pressure, the method 300 can continue to operation 330 or continue to operation 360 in which the computing device(s) 208 will activate the service lamp 206.

In operation 330, the computing device(s) 208 can determine whether the transmission of the vehicle 100 is in park. For example, the computing device(s) 208 can receive information from the transmission position sensor 218 indicating that the transmission is in park. If the computing device(s) 208 determines that the transmission of the vehicle 100 is in park, the method 300 can continue to operation 340 or continue to operation 360 in which the computing device(s) 208 will activate the service lamp 206.

In operation 340, the computing device(s) 208 can determine whether the vehicle 100 is in a low-light environment. For example, the computing device(s) 208 can receive information from the external environment sensor(s) 220 indicating that the vehicle is in a low-light environment. If the computing device(s) 208 determines that the vehicle 100 is in a low-light environment, the method 300 can proceed to operation 350 or continue to operation 360 in which the computing device(s) 208 will activate the service lamp 206.

In operation 350, the computing device(s) 208 can determine whether the jack has been removed from the vehicle 100. For example, the computing device(s) 208 can receive information from the jack location sensor 222 indicating that the jack has been removed from the vehicle 100. If the computing device(s) 208 determines that the jack has been removed from the vehicle 100, the method can proceed to operation 360 in which the computing device(s) 208 will activate the service lamp 206.

With reference once again to FIG. 2, as noted above, the processor(s) 210, the memory 212, and the control module 214 together serve as the computing device(s) 208 whose control module 214 orchestrates the operation of the vehicle 100, including but not limited to the operation of the lighting system 200. The control module 214 may be a global control module. Relatedly, as part of a central control system, the vehicle 100 may include a global control unit (GCU) with which the control module 214 is communicatively connected. Alternatively, the control module 214 may be a global control module. Relatedly, as part of a central control system, the vehicle 100 may include a global control unit (GCU) to which the control module 214 belongs. Although the vehicle 100, as shown, includes one control module 214, it will be understood that this disclosure is applicable in principle to otherwise similar vehicles including multiple control modules.

The processor(s) 210 may be any components configured to execute any of the processes described herein or any form of instructions to carry out such processes or cause such processes to be performed. The processor(s) 210 may be implemented with one or more general-purpose or special-purpose processors. Examples of suitable processors include microprocessors, microcontrollers, digital signal processors or other forms of circuitry that execute software. Other examples of suitable processors include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor(s) 210 may include at least one hardware circuit (e.g., an integrated circuit) configured to carry out instructions contained in program code. In arrangements where there are multiple processor(s) 210, the processor(s) 210 may work independently from each other or in combination with one another.

The memory 212 may be a non-transitory computer readable medium. The memory 212 may include volatile or nonvolatile memory, or both. Examples of suitable memory include random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination of these. The memory 212 includes stored instructions in program code. Such instructions are executable by the processor(s) 210 or the control module 214. The memory 212 may be part of the processor(s) 210 or the control module 214 or may be communicatively connected the processor(s) 210 or the control module 214.

Generally speaking, the control module 214 includes instructions that may be executed by the processor(s) 210. The control module 214 may be implemented as computer readable program code that, when executed by the processor(s) 210, execute one or more processes described herein. Such computer readable program code may be stored in the memory 212. The control module 214 may be part of the processor(s) or may be communicatively connected the processor(s) 210.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A lighting system, comprising:
   a sideview mirror assembly, the sideview mirror assembly mountable to an exterior of a vehicle over a ground area near the vehicle; and
   a service lamp integrated with the sideview mirror assembly, the service lamp configured to project one or more narrow beams of light to illuminate one or more jack placement indicator spots on the ground area.

2. The lighting system of claim 1, wherein the service lamp is further configured to project one or more broad beams of light to illuminate at least one of the ground area and a wheel of the vehicle.

3. The lighting system of claim 2, wherein the one or more narrow beams of light are brighter than the one or more broad beams of light.

4. The lighting system of claim 2, wherein the one or more narrow beams of light are a different color than the one or more broad beams of light.

5. The lighting system of claim 1, wherein the service lamp further comprises one or more spotlights, the spotlights configured to project the one or more narrow beams of light to illuminate the one or more jack placement indicator spots.

6. The lighting system of claim 2, wherein the service lamp further comprises a floodlight, the floodlight configured to project the one or more broad beams of light to illuminate at least one of the ground area, the wheel, and a tire of the vehicle.

7. The lighting system of claim 2, wherein the service lamp further comprises at least one of a mask and an MLA, the at least one of a mask and an MLA configured to project the one or more narrow beams of light to illuminate the one or more jack placement indicator spots, and the mask configured to project the one or more broad beams of light to illuminate at least one of the ground area and the wheel.

8. The lighting system of claim 1, further comprising:
   a computing device configured to activate the service lamp upon the detection of at least one of low tire pressure of at least one tire of the vehicle, a transmission position of the vehicle being in park, a low-light external environment of the vehicle, and removal of a jack from the vehicle.

9. The lighting system of claim 1, further comprising:
   a user interface electrically configured to receive an activation input; and
   a computing device configured to activate the service lamp upon receiving the activation input from the user interface.

10. A method of operating a lighting system, the lighting system comprising a service lamp integrated with a sideview mirror assembly mountable to an exterior of a vehicle over a ground area near the vehicle, the method comprising:
    activating the service lamp to project one or more narrow beams of light to illuminate one or more jack placement indicator spots on the ground area upon at least one of receiving an activation input from a user interface of the vehicle, and the detection of at least one of low tire pressure of one or more tires of the vehicle, a transmission position of the vehicle being in park, a low-light external environment of the vehicle, and removal of a jack from the vehicle.

11. The method of claim 10, further comprising:
    activating the service lamp to project one or more broad beams of light to illuminate at least one of the ground area and a wheel of the vehicle.

12. The method of claim 11, wherein the one or more narrow beams of light are brighter than the one or more broad beams of light.

13. The method of claim 11, wherein the one or more narrow beams of light are a different color than the one or more broad beams of light.

14. The method of claim 11, wherein activating the service lamp to project the one or more narrow beams of light to illuminate the one or more jack placement indicator spots on the ground area includes activating one or more spotlights, the spotlights configured to project the one or more narrow beams of light to illuminate the one or more jack placement indicator spots.

15. The method of claim 11, wherein activating the service lamp to project the one or more broad beams of light to illuminate at least one of the ground area and the wheel includes activating a floodlight, the floodlight configured to project the one or more broad beams of light to illuminate the at least one of the ground area and the wheel.

16. The method of claim 11, wherein activating the service lamp includes activating at least one of a mask and an MLA, the at least one of a mask and an MLA configured to project the one or more narrow beams of light to illuminate the one or more jack placement indicator spots, and the mask configured to project the one or more broad beams of light to illuminate the at least one of the ground area and the wheel.

17. The method of claim 10, further comprising:
activating the service lamp upon receiving an activation input from a user interface of the vehicle.

18. The method of claim 10, further comprising:
activating the service lamp upon the detection of at least one of low tire pressure of one or more tires of the vehicle, a transmission position of the vehicle being in park, a low-light external environment of the vehicle, and removal of a jack from the vehicle.

* * * * *